(12) United States Patent
Breault

(10) Patent No.: US 7,229,711 B2
(45) Date of Patent: Jun. 12, 2007

(54) MANAGING WATER AND AUXILIARY POWER IN FUEL CELL POWER PLANT BELOW FREEZING TEMPERATURES

(75) Inventor: Richard D. Breault, North Kingstown, RI (US)

(73) Assignee: UTC Power Corporation, South Windsor, CT (US)

( * ) Notice: Subject to any disclaimer, the term of this patent is extended or adjusted under 35 U.S.C. 154(b) by 529 days.

(21) Appl. No.: 10/734,835

(22) Filed: Dec. 12, 2003

(65) Prior Publication Data
US 2005/0129991 A1    Jun. 16, 2005

(51) Int. Cl.
*H01M 8/04* (2006.01)
(52) U.S. Cl. .............................. 429/13; 429/24; 429/26
(58) Field of Classification Search .................. 429/13, 429/24, 26; 165/287
See application file for complete search history.

(56) References Cited

U.S. PATENT DOCUMENTS 3,823,037 A * 7/1974 Cairns et al. ........... 429/150 X
5,051,322 A * 9/1991 Hasenauer .................. 429/120
5,599,636 A * 2/1997 Braun ........................... 429/7
6,432,568 B1 * 8/2002 Salvador et al. .............. 429/19
2001/0028791 A1* 10/2001 Salyer ...................... 165/10 X
2005/0084735 A1* 4/2005 Breault ........................ 429/38

* cited by examiner

*Primary Examiner*—Stephen J. Kalafut
(74) *Attorney, Agent, or Firm*—M. P. Williams

(57) ABSTRACT

A stack (11) of fuel cells have water flow channels receiving water through a pump (33) from an accumulator (29) having double walls (63, 66) with vacuum insulation panels (VIPs) (65, 68) therebetween, auxiliary DC power source (80) (battery or supercapacitor) is disposed in a container (43) having double walls (81, 86) with VIPs (65, 68) encapsulated therebetween. A keep-warm heater (51) keeps the source warm enough for at least half power capacity, the source driving its own heater as well as a keep-warm heater (50) in the accumulator to keep the accumulator above freezing. A microwave heater (58) disposed in the accumulator distributes energy to melt ice using fuel cell stack power upon startup.

4 Claims, 3 Drawing Sheets

MANAGING WATER AND AUXILIARY POWER IN FUEL CELL POWER PLANT BELOW FREEZING TEMPERATURES

TECHNICAL FIELD

This invention relates to providing ultra-thin, highly effective insulation to the water accumulator and battery, or other auxiliary DC source, of a fuel cell power plant, and to the utilization of keep-warm heaters to extend time before water freezes and to maintain battery activity, as well as use of microwaves as a distributed rapid start-up heater for a fuel cell power plant.

BACKGROUND ART

A fuel cell power plant, particularly one suited to operate electric vehicles, may typically require approximately twelve liters of water, which is stored in an accumulator when the fuel cell power plant is shut down. Many utilizations of fuel cell power plants cause them to be shut down during sub-freezing temperatures. Prior attempts to insulate the water accumulator of a fuel cell power plant so that it will not freeze for several days at −20° C. (−36° F.) resulted in volumes on the order of 40 liters, which is excessive for many applications of fuel cell power plants, particularly in vehicles. As an alternative, the water accumulator in a fuel cell power plant may be provided with a rapid thaw heater. Since a rapid thaw internal heater requires distributing heating elements throughout the accumulator, a 12 liter accumulator with rapid thaw internal heating elements would require a volume on the order of 40 liters, which is excessive. Furthermore, the so-called rapid thaw heaters require several minutes to thaw the ice in the accumulator, which is unacceptable in vehicles, in the general case.

In U.S. Pat. No. 7,108,937, there is disclosed a proton exchange membrane (PEM) fuel cell stack utilizing vacuum insulation panels (VIPs) to insulate the entire stack, including providing external reactant gas manifolds and pressure plates with VIP insulation. However, the fuel cell power plant, even with an insulated stack, is still subject to rapid freezing at below freezing temperatures, and slow recovery.

DISCLOSURE OF INVENTION

Objects of the invention include: extending the time that a fuel cell power plant can be at sub-freezing temperatures before the accumulator reaches a hard freeze; extending the time that an auxiliary DC power source, such as a battery or a supercapacitor, is useful when subjected to sub-freezing temperatures with the fuel cell inoperative; reducing the time required for an inoperative fuel cell to gain full power operation after being subjected to extensive sub-freezing temperature that results in significant ice formation in the water accumulator; assuring maximum power from an auxiliary DC power source, such as a battery or supercapacitor, despite the ambient temperature to which the related fuel cell power plant is subjected; an improved startup of fuel cell power plants in sub-freezing temperatures; and extending the time within which a fuel cell power plant can be subjected to sub-freezing temperatures without affecting its ability to rapidly achieve full power operation.

According to the present invention, the water accumulator and/or auxiliary DC power source, such as battery or supercapacitor, of a fuel cell power plant is/are encased in VIP insulation. Vacuum insulation panels (VIPs) are encapsulated within double walls which form the water accumulator and/or double walls which form a freeze-resistant container for an auxiliary DC power system, such as a battery or a supercapacitor.

According further to the present invention, the water accumulator and/or a container for an auxiliary DC power source, such as a battery or a supercapacitor, is/are provided with a keep-warm heater, operating at very low power, to extend the period of time before significant ice will form in the water accumulator and to assure that the minimum temperature of the battery is one at which suitable power, such as at least half of its power capacity, will be available to assist in startup, following shut down for a large number of hours at sub-freezing temperature.

In still further accord with the present invention, in the event of an extremely hard freeze, such that the aforementioned innovations do not prevent the freeze, the ice in the water accumulator may be thawed by means of a microwave heater, which distributes the heating energy throughout the ice, and therefore does not require significant volume to achieve distributed heating. Distributed heating of ice in the accumulator so as to melt it, while using very low power generated by the fuel cell power plant (without coolant), is typically accomplished in about one-half hour by means of a microwave heater of the invention.

The present invention prevents the accumulator from reaching freezing temperature for about four days, and prevents the accumulator from being frozen solid for about 16 days, when both the VIP insulation and the keep-warm heater are utilized.

The present invention maintains the temperature of the DC source, such as a battery, high enough to retain at least about half power capacity, when it is in a −20° C. (−36° F.) environment.

Other objects, features and advantages of the present invention will become more apparent in the light of the following detailed description of exemplary embodiments thereof, as illustrated in the accompanying drawing.

MODES(S) FOR CARRYING OUT THE INVENTION

Figure 1:
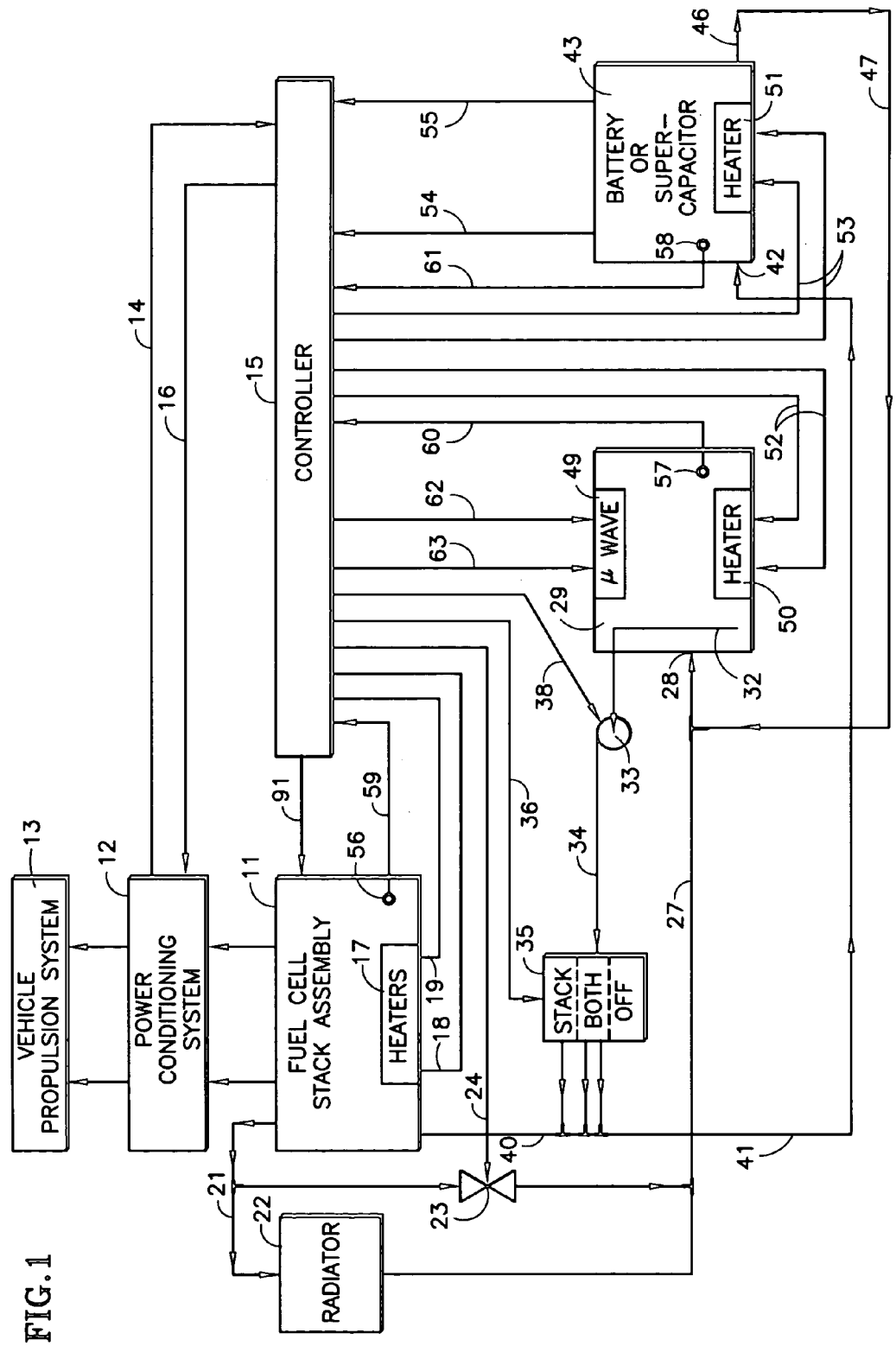
FIG. 1 is a schematic block diagram of a fuel cell power plant employing features of the present invention.

Referring to FIG. 1, a fuel cell stack assembly 11 provides DC power to a power conditioning system 12 which in turn provides appropriate power to a load, which in the exemplary embodiment herein is a vehicle propulsion system 13

(such as for an electric car). The power conditioning system 12 provides signals and power over lines 14 to a controller 15 and receives signals and power over lines 16 from the controller.

The fuel cell stack may have heaters 17, such as external to the external reactant gas manifolds, powered from the controller by lines 18, 19, if desired in any implementation of the invention.

The fuel cell stack assembly 11 has water flowing through coolant channels of water transport plates for total water management, including eliminating excess product water and assuring humidification of the membrane on both sides, all as is disclosed in the prior art. After passing through the fuel cell stack assembly 11, water flows through a conduit 21 into a radiator 22 having a bypass valve 23 controlled by a signal on a line 24 from the controller 15. From the radiator or by the bypass valve, the water flows through a conduit 27 to a water inlet 28 of a water accumulator 29.

Accumulator water is picked up (when it is not frozen) by a water suction line 32 impelled by a water pump 33 over a conduit 34 to a three-way valve 35 which is responsive to signals on a line 36 from the controller 15. The pump is operated by the controller via a line 38. The valve 35 can be set to an "off" position so that no water flows therethrough; it can be set to a "both" position in which water flows both through a conduit 40 to the water flow fields of the fuel cells in the stack 11, as well as over a conduit 41 to a water inlet 42 of coolant passages in a package 43 for an auxiliary DC power source, such a battery or a supercapacitor, in order to prevent overheating thereof. Water flows from an exit 46 of the container 43 through a conduit 47 to the inlet 28 of the accumulator 29. The valve 35 may be in the "both" position when the fuel cell stack assembly is operating normally and thus requires cooling and water management, and when the battery or supercapacitor is also being charged rapidly and therefore may overheat. The valve 35 also has a "stack" position in which water only flows to the conduit 40 to pass through the water flow fields of the fuel cells.

In accordance with the invention, both the accumulator 29 and the auxiliary power source container 43 have keep-warm heaters 50, 51 which are provided relatively low power by pairs of conductors 52, 53 from the controller 15, utilizing power from the auxiliary DC power supply on respective conductors 54, 55.

The fuel cell stack assembly 10, the accumulator 29 and the container 43 each have a temperature sensor 56, 57, 58 providing signals on lines 59, 60, 61 to the controller 15.

To accommodate situations where, despite the super insulation and keep-warm heaters of the invention, a hard freeze causes some substantial portion of the water in the accumulator 29 to freeze, a microwave heater 49 is operated at very low wattage, such as on the order of 1,000 W–2,000 W, by means of power supplied over a pair of lines 62, 63 from the controller 15, the controller then using power from an operating fuel cell stack assembly, operating at such a low power rating that it can function without any coolant water or water removal for as long as about one-half hour, which is adequate for melting twelve liters of ice by means of the microwave heater 49.

Figure 2:
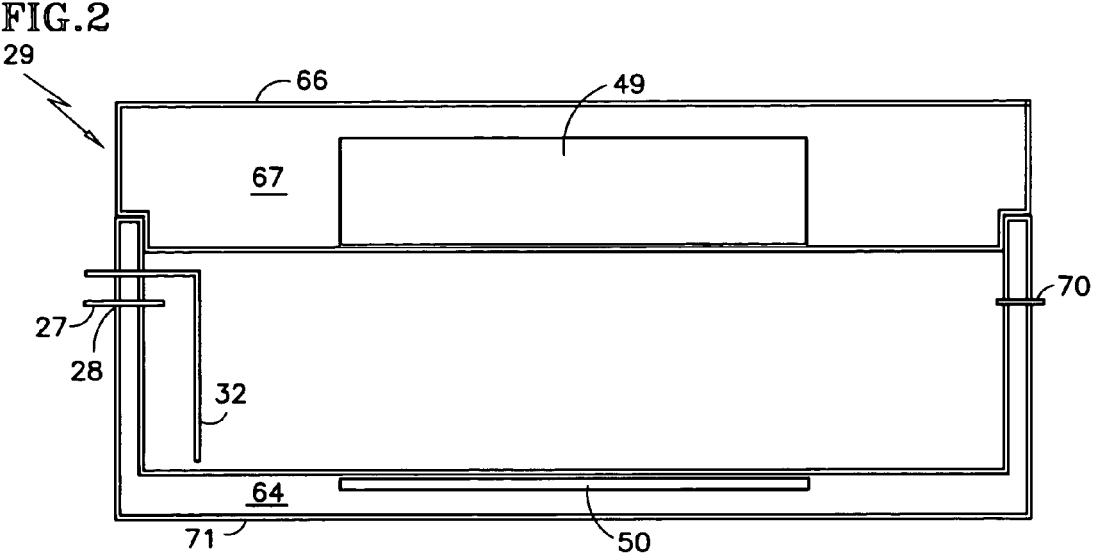
FIG. 2 is a stylized, simplified front elevation cross section of a fuel cell power plant water accumulator employing the features of the present invention (with structural cross hatching omitted for clarity).
Figure 3:
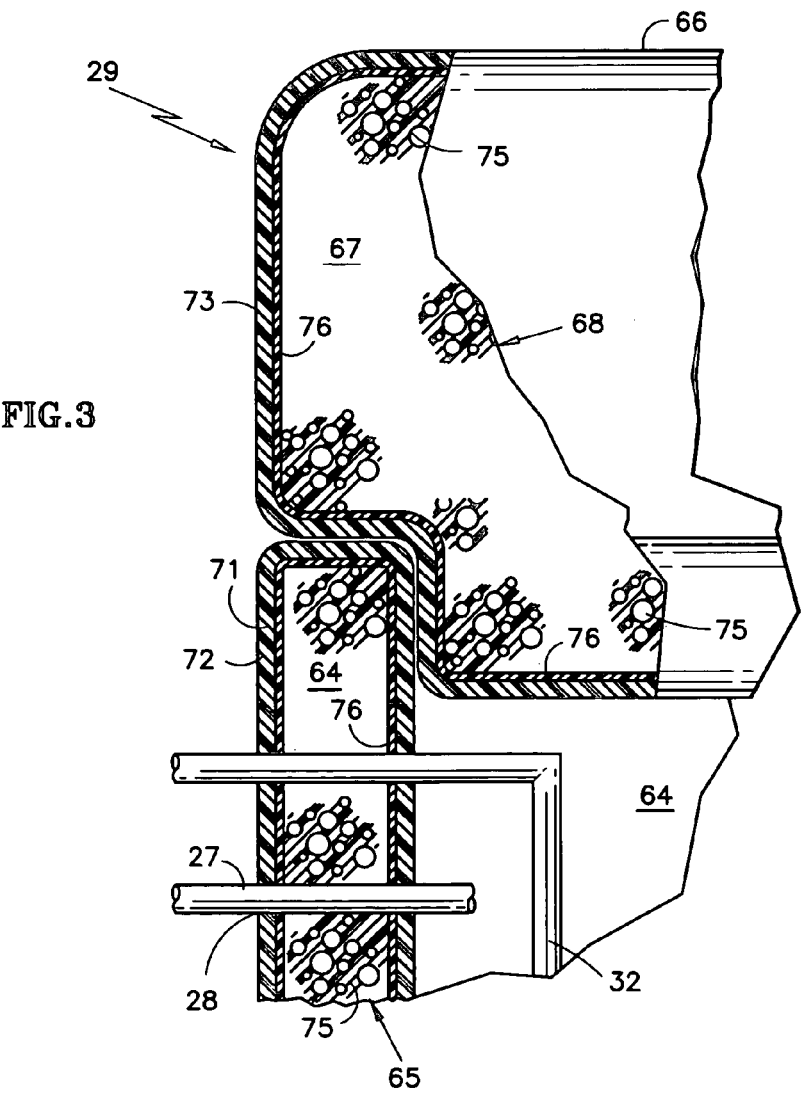
FIG. 3 is a fragmentary, side elevation view of the configuration of FIG. 2, partially sectioned and partially broken away side elevation illustrating the encapsulated VIP of the invention.
Figure 4:
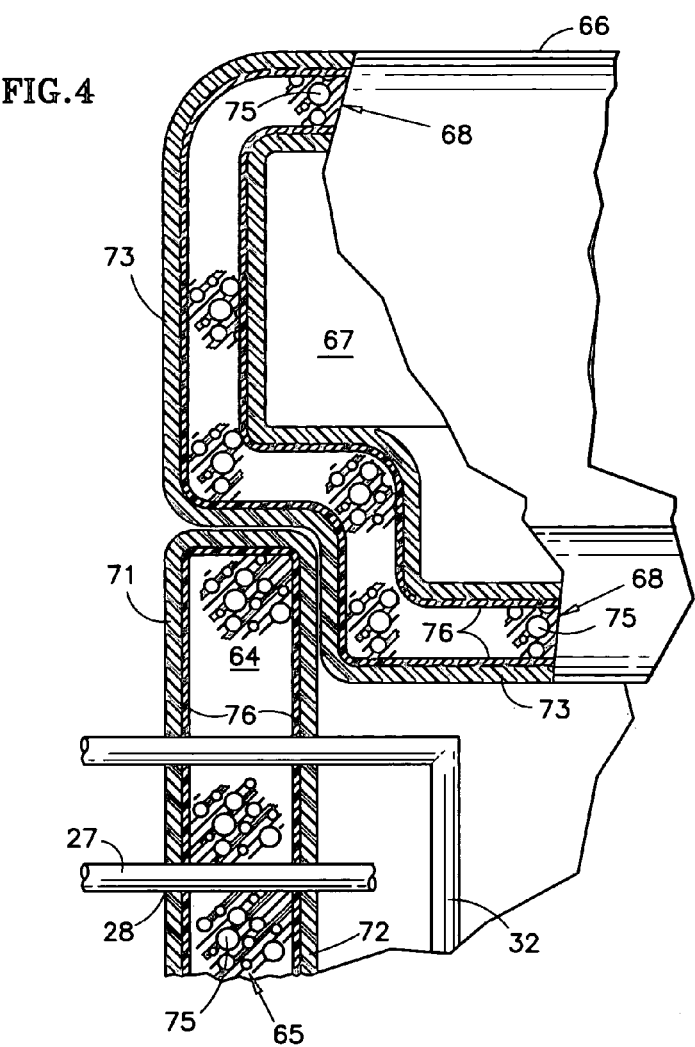
FIG. 4 is a fragmentary side elevation view of the configuration of FIG. 2, partially sectioned and partially broken away side elevation illustrating another form of encapsulated VIP insulation.

The water accumulator 29 is shown in more detail in FIGS. 2–4.

In FIG. 2, the accumulator 29 may have a water containing section 71 which is double walled and has a chamber 64 therein which encapsulates a vacuum insulation panel (VIP) 65 as is described more fully with respect to FIGS. 3 and 4.

The chamber 64 between the walls and the walls themselves are not hatched or stippled for clarity, such being adequately shown in FIGS. 3 and 4.

The water accumulator 29 also has a cover section 66 which has double walls providing a chamber 67 which completely encapsulates a VIP 68 as shown in FIGS. 3 and 4. The heater 50 is adjacent to the inner wall of the water containment section 63 and the VIP 65 is between it and the outer wall. Similarly, the microwave heater 49 is disposed adjacent the inner wall of the cover portion 66 and the VIP 68 is between it and the outer wall thereof. The water containment section typically has a gas vent 70.

The walls 72, 73 of the portions 63 and 66 are typically formed of a composite of plastic or glass fiber reinforced with resin, but other materials may be used to suit a particular implementation of the invention.

Referring to FIG. 3, within the chambers 64, 67 formed by the walls 72, 73 the VIPs 65, 68 consist of a filler material 75 called a "core" that is encapsulated in a barrier film 76, which may simply be plastic, or may be a plastic film which, is sputter coated with thin metal film, or may be an aluminum or other metal thin film reinforced by plastic film laminations on each side. The barrier film is evacuated to a pressure between 0.001 Torr (0.0013 mbar) and 1.0 Torr (1.3 mbar), and thereafter sealed. The details of the VIP are irrelevant to the present invention, and may be chosen to suit any particular implementation thereof. The core may be thermal formed to the shape of the walls 72, 73 prior to being encapsulated within the barrier film.

The core material serves three main purposes. First, the core supports the panel walls. Since atmospheric pressure exerts 14.7 psi on the evacuated panel, a one square foot panel would be subject to 2,120 pounds of force. Second, the core material also inhibits the movement of the remaining gas molecules. The smaller the core pore size, the more likely it is that the gas molecules will collide with the branched network of the core material rather than reaching the walls of the VIP. This essentially traps the molecules, and any heat that is conducted to the solid core material would have to pass through a tortuous branch network, where it is mostly dissipated, prior to reaching the walls of the VIP. A core that is based on microporous material, having the smallest pore size, therefore provides the best insulating performance of any solid material. Third, the core materials provide a barrier against heat transfer by radiation and often include special opacifying materials that scatter or absorb infrared radiation. VIPs can presently be provided with thermal conductivities of between 0.002 Watts per meter degree Kelvin (W/m° K.), and 0.008 W/m° K. The VIP 68 may fill the entire chambers 67 as illustrated in FIG. 3, or it may be confined to a thickness similar to the thickness of the VIP 65, as is illustrated in FIG. 4.

Figure 5:
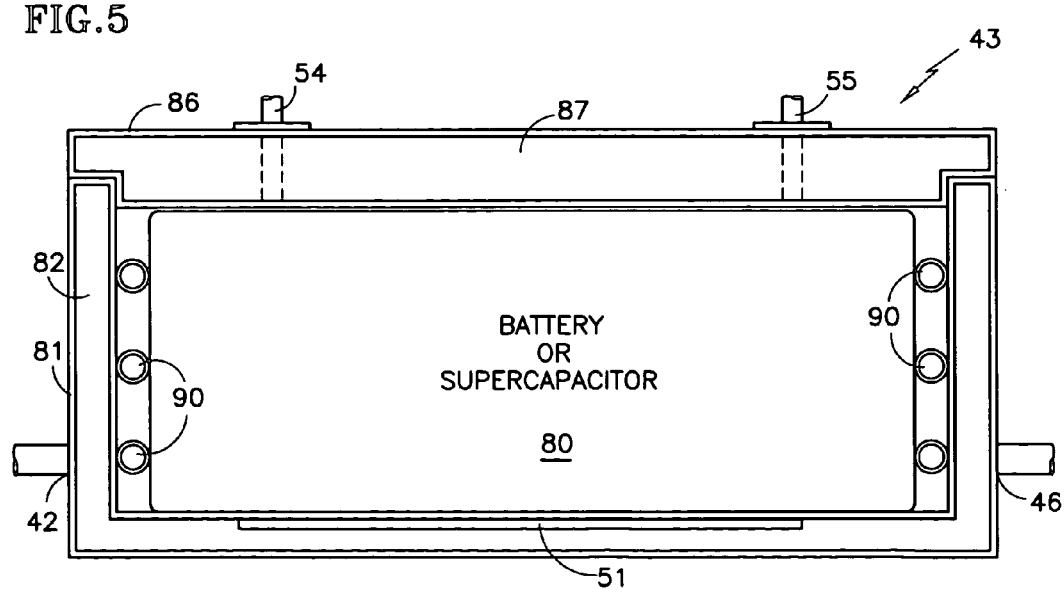
FIG. 5 is a simplified, stylized front elevation cross sectional view, with structural cross hatching removed for clarity (with structural cross hatching omitted for clarity), of an auxiliary DC power supply container employing features of the invention.

Referring to FIG. 5, the container 43 for a battery or supercapacitor 80 includes a double walled container 81 which forms a chamber 82 within which the VIP, as illustrated in FIGS. 3, and 4, is encapsulated. The container has a double walled top 86 which provides a chamber 87 within which a VIP (similar to VIPs 65, 68) is encapsulated.

The heater 51 is adjacent the inner wall of the container 43 and there is an encapsulated VIP between the heater 51 and the outer wall of the container 43. A plurality of coolant tubes 90 extend around the inner periphery of the double walls 81 to flow coolant from the inlet 42 to the outlet 46 whenever the valve 35 (FIG. 1) is in the "both" position, which the controller will cause whenever the rate of charge of the battery or the supercapacitor is such that excessive heating may occur.

In operation, whenever the fuel cell stack assembly is not operating, power from the DC source (battery or supercapacitor) on lines 54, 55 keeps the controller 15 operating. The controller then responds to temperature signals on the lines 59–61 to direct power from the DC source to the heaters 17, 50, 51, as needed. Specifically, in accordance with the invention, once the controller senses that the accumulator 29 has reached a temperature of 0° C. (32° F.) it will provide on the order of 5 watts of power to the heater 50, so that the accumulator will not fall below freezing for temperatures as low as −20° C. (−36° F.) when the accumulator is formed of the double walled, encapsulated VIP as described hereinbefore. Similarly, when the controller senses from the signal on the line 61 that the container 43 has reached a temperature, such as +10° C. (50° F.), the controller will cause the heater 51 to maintain that temperature, utilizing only about 3 watts of power when the container is the double walled, encapsulated VIP described hereinbefore. The combination of the VIP insulation on the order of 0.004 W/m° K., and the keep-warm heater prevents the accumulator from freezing in a −20° C. (−36° F.) ambient, indefinitely, and will prevent all of the water (20 liters) in the accumulator from freezing for about 16 days.

Should the controller determine from the temperature signals on the lines 60, 61 that there is a hard freeze, and that therefore the water in the accumulator 29 is all frozen, then the controller may nonetheless start up the fuel cell stack assembly and draw on the order of 2 kW–5 kW from the fuel cell stack to operate the microwave heater, and thaw the ice in a little over one-half hour.

When startup is to occur, the controller provides power from the battery or supercapacitor 80 and valve-controlling signals over lines 91 to provide fuel, run an air blower, and so forth.

The container 43, without coolant tubes 90, if desired, may be used for batteries other than in conjunction with fuel cell power plants. It may be used in conventional hydrocarbon-fueled vehicles, off-road recreation vehicles, snowmobiles, and the like. The battery may use its own power to provide a small amount of power to a keep-warm heater.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of operating a fuel cell power plant having a water accumulator, to extend time before water in said accumulator freezes in an ambient below freezing temperature of water, comprising:
   completely insulating said accumulator with first vacuum insulation panels;
   providing a first keep-warm heater between said accumulator and said first vacuum insulation panels;
   providing an auxiliary dc power source selected from (a) a battery and (b) a supercapacitor, completely insulated with second vacuum insulation panels and having a second keep-warm heater between said source and said second vacuum insulation panels; and
   providing power from said source to said second keep-warm heater to maintain said source at or above a temperature at which said source has about half of its power capacity; end
   providing power from said source to said first keep-warm heater whenever the temperature of said accumulator approaches freezing temperature of water.

2. A fuel cell power plant, comprising:
   a stack of fuel cells, each cell having water flow channels;
   a water pump;
   a water accumulator having a water suction outlet connected to said pump, said water accumulator having double walls with at least one first vacuum insulated panel (VIP) encapsulated therebetween;
   an auxiliary DC power source selected from (a) a battery and (b) a supercapacitor;
   a container for said source, said container having double waits with at least one second VIP encapsulated therebetween;
   a first keep-warm heater disposed between a first inner wall of said water accumulator and said at least one first VIP;
   a second keep-warm heater disposed between an inner wall of said container and said at least one second VIP;
   a controller;
   a temperature sensor within said accumulator providing to said controller a first signal indicative of temperature in said accumulator;
   a temperature sensor within said container providing to said controller a second signal indicative of temperature in said container;
   said controller causing power from said source (c) to be applied to said second keep-warm heater to retain said source at a sufficient temperature so as to retain on the order of one-half of the capacity of said source, and (d) to be applied to said first keep-warm heater to retain temperature of said accumulator at or above freezing temperature.

3. A fuel cell power plant, comprising:
   a stack of fuel cells, each having water flow channels;
   a water pump;
   a water accumulator having a water suction outlet connected to said pump;
   a controller;
   a temperature sensor within said accumulator providing to said controller a signal indicative of temperature in said accumulator;
   a microwave heater disposed in proximity of water in said accumulator; end
   said controller, in response to said temperature signal indicating that water in said accumulator is frozen, causing, upon startup of said fuel cell power plant, power generated by said stack of fuel cells to be applied to said microwave heater, thereby to melt the ice in said accumulator.

4. A fuel cell power plant, comprising:
   a stack of fuel cells, each cell having water flow channels;
   a water pump;
   a water accumulator having a water suction outlet connected to said pump, said water accumulator having double walls with at least one first vacuum insulated panel (VIP) encapsulated therebetween;
   an auxiliary DC power source selected from (a) a battery and (b) a supercapacitor;
   a container for said source, said container having double walls with at least one second VIP encapsulated therebetween;
   a first keep-warm heater disposed between a first inner wall of said water accumulator and said at least one first VIP;

a second keep-warm heater disposed between an inner wall of said container and said at least one second VIP;
a controller;
a temperature sensor within said accumulator providing to said controller a first signal indicative of temperature in said accumulator;
a temperature sensor within said container providing to said controller a second signal indicative of temperature in said container;
said controller causing power from said source to be applied (C) to said second keep-warm heater to retain temperature of said source at a sufficient temperature so as to retain on the order of one-half of the capacity of said source, and (d) to said first keep-warm heater to retain temperature of said accumulator at or above freezing temperature;
a microwave heater disposed in proximity of water in said accumulator;
said controller, in response to said first temperature signal indicating that water in said accumulator is frozen, causing, upon startup of said fuel cell power plant, power generated by said stack of fuel cells to be applied to said microwave heater, thereby to malt ice in said accumulator.

* * * * *